US008135240B2

(12) United States Patent
Satoh

(10) Patent No.: US 8,135,240 B2
(45) Date of Patent: Mar. 13, 2012

(54) IMAGE SEARCHING DEVICE, METHOD AND RECORDING MEDIUM

(75) Inventor: Naoyuki Satoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 867 days.

(21) Appl. No.: 12/200,200

(22) Filed: Aug. 28, 2008

(65) Prior Publication Data

US 2009/0060393 A1 Mar. 5, 2009

(30) Foreign Application Priority Data

Aug. 28, 2007 (JP) ................. 2007-221244

(51) Int. Cl.
*G06K 9/54* (2006.01)

(52) U.S. Cl. ........ 382/305; 345/418; 345/419; 345/420; 703/1

(58) Field of Classification Search .......... 345/418, 345/420; 382/225
See application file for complete search history.

(56) References Cited

U.S. PATENT DOCUMENTS

| | | | |
|---|---|---|---|
| 5,350,303 A * | 9/1994 | Fox et al. ........ | 434/118 |
| 5,485,560 A * | 1/1996 | Ishida et al. ........ | 345/619 |
| 6,016,487 A * | 1/2000 | Rioux et al. ........ | 707/743 |
| 6,928,396 B2 * | 8/2005 | Thackston ........ | 703/1 |
| 7,171,060 B2 * | 1/2007 | Park et al. ........ | 382/305 |
| 7,197,372 B2 * | 3/2007 | Hazama ........ | 700/165 |
| 7,315,830 B1 * | 1/2008 | Wirtz et al. ........ | 705/14.1 |
| 7,467,074 B2 * | 12/2008 | Faruque et al. ........ | 703/8 |
| 7,737,966 B2 * | 6/2010 | Nishida et al. ........ | 345/419 |
| 7,761,264 B2 * | 7/2010 | Hotta et al. ........ | 703/1 |
| 7,859,544 B2 * | 12/2010 | Okada ........ | 345/581 |
| 2001/0056488 A1 * | 12/2001 | Maeda et al. ........ | 709/225 |
| 2002/0007225 A1 * | 1/2002 | Costello et al. ........ | 700/99 |
| 2003/0103083 A1 * | 6/2003 | Denny et al. ........ | 345/771 |
| 2004/0254864 A1 * | 12/2004 | Mitsuoka et al. ........ | 705/29 |
| 2005/0071135 A1 * | 3/2005 | Vredenburgh et al. ........ | 703/1 |
| 2005/0248560 A1 * | 11/2005 | Agrawala et al. ........ | 345/418 |
| 2005/0251520 A1 * | 11/2005 | Vidov et al. ........ | 707/100 |
| 2006/0149405 A1 * | 7/2006 | Okada et al. ........ | 700/107 |
| 2006/0178944 A1 * | 8/2006 | Katter et al. ........ | 705/26 |
| 2007/0008621 A1 * | 1/2007 | Satoh et al. ........ | 359/465 |
| 2007/0077025 A1 * | 4/2007 | Mino ........ | 386/95 |
| 2007/0168226 A1 * | 7/2007 | Brown ........ | 705/2 |
| 2007/0198367 A1 * | 8/2007 | Yamagata et al. ........ | 705/26 |

(Continued)

FOREIGN PATENT DOCUMENTS

JP 09-190456 7/1997

(Continued)

*Primary Examiner* — Jason M Repko
*Assistant Examiner* — Gandhi Thirugnanam
(74) *Attorney, Agent, or Firm* — Dickstein Shapiro LLP

(57) ABSTRACT

An image searching device including a database, a user interface, a search unit, and an output unit. The search unit includes a data management unit configured to manage data on a model to be searched and acquired from the database and create an image to be displayed on a screen of the user interface; a determination unit configured to determine and extract parts each having a boundary included in a closed region as candidate parts; a part selection unit configured to display single images of the candidate parts on the screen of the user interface to enable selection of a target part; and an image switching unit configured to create data on a part emphasis frame and switch the screen displayed on the user interface from the single images of the candidate parts to a full image in which the target part is highlighted with the part emphasis frame.

7 Claims, 7 Drawing Sheets

U.S. PATENT DOCUMENTS

| | | | |
|---|---|---|---|
| 2007/0216681 A1* | 9/2007 | Nishida et al. | 345/427 |
| 2007/0288504 A1* | 12/2007 | Kagawa et al. | 707/102 |
| 2007/0291026 A1* | 12/2007 | Kagawa et al. | 345/418 |
| 2008/0052053 A1* | 2/2008 | Yoshihara | 703/6 |
| 2008/0062170 A1* | 3/2008 | Satoh et al. | 345/420 |
| 2008/0086324 A1* | 4/2008 | Yamagata et al. | 705/1 |
| 2008/0170070 A1* | 7/2008 | Yamagata | 345/420 |
| 2009/0052787 A1* | 2/2009 | Satoh | 382/225 |
| 2009/0060393 A1* | 3/2009 | Satoh | 382/305 |
| 2009/0122059 A1* | 5/2009 | Katooka et al. | 345/420 |
| 2009/0189899 A1* | 7/2009 | Satoh | 345/427 |
| 2010/0153382 A1* | 6/2010 | Vidov et al. | 707/723 |
| 2010/0241477 A1* | 9/2010 | Nylander et al. | 705/8 |
| 2011/0141109 A1* | 6/2011 | Radet et al. | 345/420 |

FOREIGN PATENT DOCUMENTS

| | | |
|---|---|---|
| JP | 2006-039872 | 2/2006 |
| JP | 2007-042077 | 2/2007 |

* cited by examiner

IMAGE SEARCHING DEVICE, METHOD AND RECORDING MEDIUM

CROSS-REFERENCE TO RELATED APPLICATIONS

This patent specification is on the basis of and claims priority from Japanese Patent Application No. 2007-221244 filed on Aug. 28, 2007 in the Japan Patent Office, the entire contents of which are hereby incorporated by reference herein.

BACKGROUND

1. Field of the Invention

The present invention relates to an image searching device configured to search an image to be used from a database storing images of parts created on the basis of a three-dimensional model including multiple parts, an image searching method for searching the image, and a program used for searching the image.

2. Description of the Related Art

Recent improvements in computer performance and graphic processing technology have led to rapidly expanded use of three-dimensional models created by CAD (Computer-Aided Design) and CG (Computer Graphics). The three-dimensional models thus created are often used to create an image that can be viewed stereoscopically. In particular, the three-dimensional models are widely used in manufacturing industrial products. For example, the three-dimensional models are used to create an image to display a product model in a parts catalog, a service manual, and so forth. Further, contents including such an image are used as an electric medium.

Many industrial products, such as machines and electronic devices, include multiple parts. Therefore, a part included in the product is often required to be easily recognized in a full image of the entire product.

Conventionally, the part has been recognized by specifying a position or a region of the part in three dimensions on a screen displaying the three-dimensional model of the product, to extract the part on the basis of its geometric relations with other parts.

The above-described method for extracting the part is applied to a method disclosed, for example, in published unexamined Japanese Patent Application No. (hereinafter referred to as JP-A-) H09-190456. In a CAD system installing data on a three-dimensional product model, a closed space having a height, a width, and a depth is specified in three dimensions to extract a part belonging to the closed space thus specified. Further, JP-A-2006-039872 discloses a method in which a reference position, a reference direction, and a distance from the reference position in three dimensions are identified as geometric search criteria by a user using a stylus to extract a part that satisfies the geometric search criteria.

Thus, in both of the above-described methods, the three-dimensional space to be searched is specified by the user to extract the part. In other words, the user is required to identify the position of the part to be extracted in three dimensions.

Moreover, the user is required to perform a complicated operation to input data to specify the part to be extracted. Further, because geometric relations with other parts are calculated each time a part is extracted, a processing load increases as the number of parts to be extracted increases. Consequently, a lower performance processor cannot perform the required larger amount of calculation due to lack of processing speed.

To solve such problems, JP-A-2007-042077 discloses a method in which a two-dimensional closed region is specified by the user on a screen displaying a two-dimensional image of an entire model created on the basis of a three-dimensional model to extract a part belonging to the two-dimensional closed region thus specified. In the above-described method, multiple parts belonging to the two-dimensional closed region are displayed on the screen such that the user can select a target part from the multiple parts. Further, the target part selected by the user is highlighted in the two-dimensional image of the entire model.

In the method disclosed in JP-A-2007-042077, when the target part is searched, the closed region is specified in the two-dimensional image of the entire model displayed on the screen in order to limit the number of parts to be searched to the parts belonging to the closed region thus specified. In addition, a list of single images of the parts belonging to the closed region is displayed on the screen. When a single image of a part in the list is temporarily selected by the user, such a part is highlighted in the two-dimensional image of the entire model on the screen so that the user can visually confirm whether or not the part temporarily selected is a target part.

However, in a case in which the part temporarily selected is too small relative to the two-dimensional image of the entire model, it is difficult for the user to visually confirm the part even when the part is highlighted, resulting in lower work efficiency of the user.

SUMMARY

In view of the foregoing, the present invention provides a device and a method for searching an image of a part from a two-dimensional full image of a model created on the basis of a three-dimensional model to improve visibility of the part highlighted in the two-dimensional image of the entire model displayed on a screen even when the part is too small relative to the two-dimensional image of the entire model, thereby improving work efficiency of the user.

This patent specification describes an image searching device including a database configured to store two-dimensional full images of models each including multiple parts, highlighted full images in which a part is highlighted, and single images of each part, each created on the basis of a three-dimensional image of the model; and boundary data for each part; a user interface having a GUI function; a search unit configured to search for a single image of a part and a highlighted full image through the database in accordance with search criteria specified through the user interface; and an output unit configured to output search results from the search unit. The search unit includes a data management unit configured to manage data on a model to be searched and acquired from the database and create an image to be displayed on a screen of the user interface in accordance with first search criteria input through the user interface; a determination unit configured to determine and extract parts each having a boundary included in a closed region as candidate parts by comparing the closed region specified using a pointer in a full image of the entire model to be searched and displayed on the screen of the user interface with boundary data for each part of the model to be searched in accordance with second search criteria; a part selection unit configured to display single images of the candidate parts extracted by the determination unit on the screen of the user interface to receive third search criteria for selecting a target part from the candidate parts displayed on the screen; and an image switching unit configured to create data on a part emphasis frame to be added to the target part in the full image with highlights displayed on the screen on the basis of the boundary data of the target part, and switch the screen displayed on the user interface from the single images of the candidate parts to a full image in which the target part is highlighted with the part emphasis frame.

This patent specification further describes an image searching method including storing two-dimensional full images of models each including multiple parts, highlighted full images in which a part is highlighted, and single images of each part, each created on the basis of a three-dimensional image of the model, and boundary data for each part in a database; and searching for a single image of a part and a highlighted full image stored in the database in accordance with search criteria specified by the database through a user interface having a GUI function. The searching includes managing data on a model to be searched and acquired from the database to create an image to be displayed on a screen of the user interface in accordance with first search criteria input through the user interface; determining and extracting parts each having a boundary included in a closed region as candidate parts by comparing the closed region specified using a pointer in a full image of the entire model to be searched and displayed on the screen of the user interface with boundary data for each part of the model to be searched in accordance with second search criteria; selecting a target part from the candidate parts by displaying single images of the candidate parts extracted by the determining on the screen of the user interface to receive third search criteria; and switching the screen displayed on the user interface from the single images of the candidate parts to a full image in which the target part is highlighted with a part emphasis frame created on the basis of the boundary data of the target part.

This patent specification further describes a program for causing a computer to function as the search unit of the image searching device described above.

This patent specification further describes a computer-readable recording medium recording the program described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
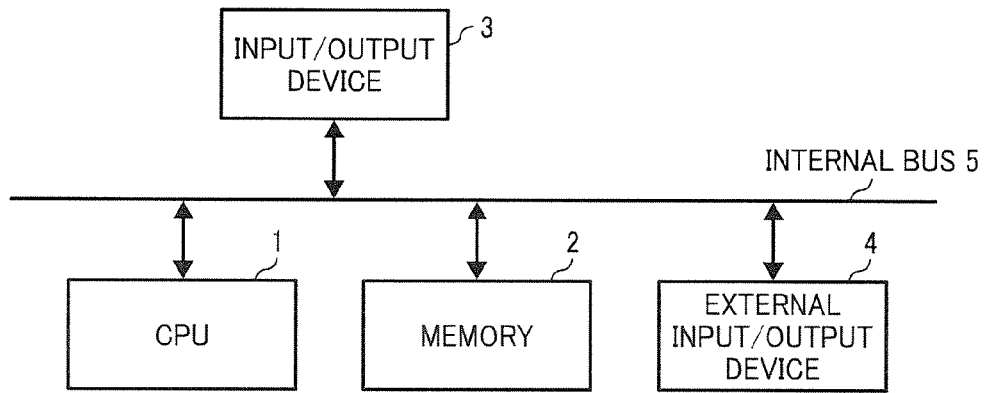
FIG. 1 is a schematic view illustrating a hardware configuration of a data processing device capable of building a parts catalog creation/browsing system according to exemplary embodiments.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof.

An image searching device according to the present invention has a capability to search data such as an image of a part stored in a database. The database stores data such as, for example, images of parts used for a catalog of the parts (hereinafter referred to as a parts catalog) created on the basis of a three-dimensional model including multiple parts. The three-dimensional model is data representing a shape of the model in three dimensions. Examples of the three-dimensional model include three-dimensional CAD data and data obtained by measuring an actual object in three dimensions.

In exemplary embodiments described in detail below, the image searching device according to the present invention is employed in a system configured to create a database storing the parts catalog to search and browse a target image stored in the database (hereinafter referred to as a parts catalog creation/browsing system).

FIG. 1 is a schematic view illustrating a hardware configuration of a data processing device capable of building the parts catalog creation/browsing system to be described in detail later with reference to FIG. 2.

Referring to FIG. 1, the data processing device includes a central processing unit (CPU) 1, a memory 2, an input/output device 3, an external input/output device 4, and an internal bus 5 connecting the above-described components. The data processing device may include a hardware configuration such as a general-purpose personal computer or a personal computer to which a peripheral device is connected.

The CPU 1 is configured to control operations of the data processing device and drive various application programs, work data, file data, and so forth stored in the memory 2 to achieve data processing functions of each application. A program for creating the parts catalog and a program for searching and browsing the parts catalog are installed as an application program to form a catalog creation unit 20, an image compensation unit 25, a position data compensation unit 26, and a catalog browser 27 included in the parts catalog creation/browsing system. The CPU 1 builds various databases used in the parts catalog creation/browsing system by operating in conjunction with the memory 2 and the external input/output device 4 to manage the data.

Under control of the CPU 1, the input/output device 3 receives instructions such as processing requirements input by a user. Further, the input/output device 3 functions as a user interface configured to inform the user of operation conditions of the data processing device varied in accordance with the processing requirements input by the user through a display. In exemplary embodiments, the input/output device 3 functions as a graphical user interface (GUI) so that data is input through an input screen displayed on the display by operating a keyboard, a mouse, and so forth.

The external input/output device 4 is a peripheral device provided for expanding functions of the data processing device. For example, an external storage device capable of using a recording medium for acquiring data necessary for processing from an external device or a recording medium having a larger capacity for building databases, and an output device such as a printer and a display which use data output from the parts catalog creation/browsing system, may be used as the external input/output device 4.

A description is now given of the parts catalog creation/browsing system according to exemplary embodiments.

The parts catalog creation/browsing system according to exemplary embodiments mainly includes a generator configured to create a database storing the parts catalog (hereinafter referred to as catalog database) and a searcher/browser configured to search and browse a specified parts catalog stored in the catalog database.

The generator creates a database to store the parts catalog having a two-dimensional image created on the basis of the three-dimensional model including multiple parts. The database thus created manages data including two-dimensional images of each part used for the parts catalog, and attributes and details used for identifying each part. The searcher/browser outputs the data such as two-dimensional image data of a specified part managed by the database as data for display.

Figure 2:
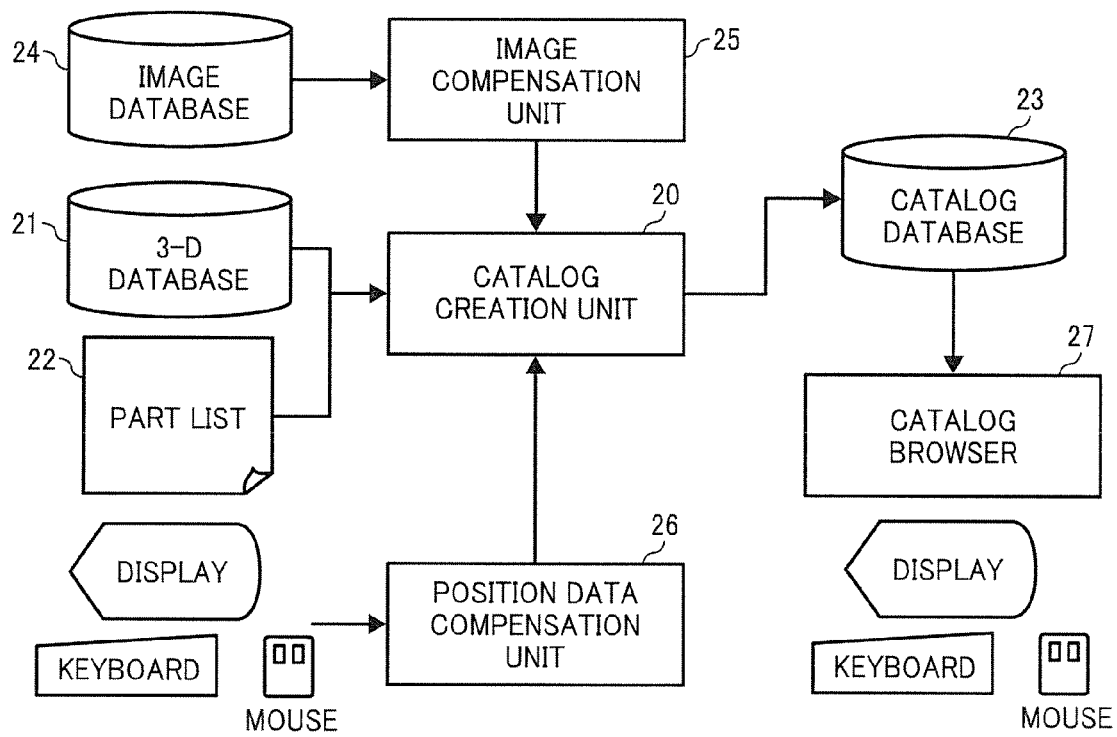
FIG. 2 is a block diagram illustrating a configuration of the parts catalog creation/browsing system.

FIG. 2 is a schematic view illustrating a configuration of the parts catalog creation/browsing system according to exemplary embodiments. As described above, a data processing part of the parts catalog creation/browsing system, that is, the catalog creation unit 20, the image compensation unit 25, the position data compensation unit 26, and the catalog browser 27, and databases such as a 3-D database 21, a part list 22, a catalog database 23, and an image database 24 may be formed by the memory 2 and the input/output device 3 under control of the CPU 1.

A configuration and operation of the generator configured to create the catalog database 23 are described in detail below with reference to FIG. 2.

The 3-D database 21 stores three-dimensional models used for creating the parts catalog. In exemplary embodiments, the 3-D database 21 stores three-dimensional CAD data. The three-dimensional CAD data stored in the 3-D database 21 includes shape data for each part included in the model, and data on the entire model including multiple parts.

The part list 22 describes a list of exchangeable parts required to be included in the parts catalog. The list stored in the part list 22 includes data such as a name and an order number of each part. Such data is managed for each unit of the model.

The catalog creation unit 20 references data stored in the 3-D database 21 when three-dimensional CAD data of a part registered in the list stored in the part list 22 is stored in the 3-D database 21. Meanwhile, the catalog creation unit 20 uses image data input from the image compensation unit 25 when the three-dimensional CAD data of such a part is not stored in the 3-D database 21.

The image compensation unit 25 compensates image data from the image database 24 which stores two-dimensional image data. When the catalog creation unit 20 performs image compensation using image data obtained from the image compensation unit 25, position data input from the position data compensation unit 26 is specified as a position where the image data is compensated. Accordingly, the parts catalog is created in accordance with the position data.

The image data stored in the image database 24 is prepared as data for compensating data on the part of which three-dimensional CAD data is not stored in the 3-D database 21 when the parts catalog is created. Because a two-dimensional image of the part is required for the parts catalog creation/browsing system according to exemplary embodiments, an example of the image data stored in the image database 24 includes two-dimensional data, such as an image photographed by a digital still camera and an illustrated image.

Because the image of the part compensated from the image database 24 is data on a single part, a position of the part is required to be specified in a full image of the entire model in order to output the two-dimensional data as catalog data.

The position of the part in the full image of the entire model is input into the position data compensation unit 26 by the user through the input/output device 3. The position data compensation unit 26 sends data on the position thus specified by the user to the catalog creation unit 20.

The catalog creation unit 20 creates two-dimensional image data of the specified part as catalog data as described above regardless of whether or not the image of the part is stored in the 3-D database 21 as three-dimensional CAD data. Thereafter, the catalog creation unit 20 outputs the catalog data to a downstream processing unit. The catalog data includes image data and a part name displayed to the user as the parts catalog, as well as attributes and details used for identifying each part so as to be used for searching.

In the parts catalog creation/browsing system illustrated in FIG. 2, the parts catalog created by the catalog creation unit 20 can be browsed. The parts catalog created by the catalog creation unit 20 is stored in the catalog database 23 such that catalog data stored in the catalog database 23 can be browsed through the catalog browser 27.

Because the catalog browser 27 handles a two-dimensional image created on the basis of a three-dimensional model, an image of the three-dimensional model viewed from multiple different viewpoints at multiple different zoom levels (refer to a screen 601 illustrated in FIG. 6A to be described in detail later), an image in which a specific part is highlighted (refer to a screen 704 illustrated in FIG. 7 to be described in detail later), boundary data for specifying a boundary of an image area to which the specific part belongs, and an image of a single part viewed from multiple different viewpoints at multiple different zoom levels (refer to screens 603, 605, and 607 illustrated in FIG. 6B to be described in detail later) are prepared in advance with the name of each part and stored in the catalog database 23.

Data that can be created with relatively simple processing, such as an image with a specified scale of enlargement, may be created as needed in response to a request without being stored in the catalog database 23 in advance. When a data amount is too large, the external input/output device 4 may be used as the catalog database 23.

A description is now given of a configuration and operation relating to a function of searching the parts catalog in the parts catalog creation/browsing system. In the parts catalog creation/browsing system illustrated in FIG. 2, the catalog browser 27 has the function of searching an image of a part to be browsed from data created by the catalog creation unit 20 and managed by the catalog database 23.

The catalog browser 27 browses the catalog database 23 to search target catalog data in accordance with a request from the user. When receiving the request from the user through the GUI on the screen, the catalog browser 27 acquires data on a model specified by the user from the catalog database 23 (this process is hereinafter referred to as a first search). Subsequently, the catalog browser 27 displays a full entire two-dimensional image of the entire specified model acquired in the first search on the screen to the user. The user specifies a part (candidate part) in the full two-dimensional image of the entire model displayed on the screen, and the catalog browser 27 searches two-dimensional image of the candidate parts from the data acquired in the first search (this process is hereinafter referred to as a second search). Thereafter, the catalog browser 27 displays the two-dimensional images of the candidate parts on the screen to the user, and searches catalog data of a target part eventually specified by the user from among the two-dimensional images of the candidate parts (this process is hereinafter referred to as a third search).

As described above, both the full image of the entire specified model displayed on the screen to the user and the image of the part output as catalog data are two-dimensional image data. As a result, processing load for searching can be reduced.

In the second search, when the part is specified in the two-dimensional image of the entire model displayed on the screen, the user is prompted to specify a position of the part in the two-dimensional image of the entire model displayed on the screen to reduce a number of targeted parts. In exemplary embodiments, first, an area to be searched is determined by specifying the position of the part so that parts belonging to the area are determined as candidate parts in which the target part searched for by the user is included. Thereafter, the catalog browser 27 displays single images of the candidate parts to the user so that the user can easily find the target part among the candidate parts. The sequence of processes described above is one of the distinctive features of the parts catalog creation/browsing system according to the exemplary embodiments described herein.

In the third search, the target part searched for by the user is ultimately selected from among the candidate parts displayed on the screen, and the result is output.

The part temporarily selected as the target part is highlighted in the full image displayed on the screen, and further, the target part is framed by a frame for emphasis. The temporary selection of the target part described above means a state in which a key is not yet operated to ultimately identify the part as the target part. Therefore, when the temporarily selected part is not the target part searched for by the user, such part is not ultimately determined as the target part by operating the key, and the user can start a new search to select the other part as the target part.

The function of displaying the frame for emphasizing the part (hereinafter referred to as a part emphasis frame) improves visibility of the part highlighted in the full image of the entire model on the screen even when it is difficult to find the part because the part is too small relative to the full image of the entire model, thereby improving work efficiency of the user. The function described above is also one of the distinctive features of the parts catalog creation/browsing system according to exemplary embodiments.

Figure 3:
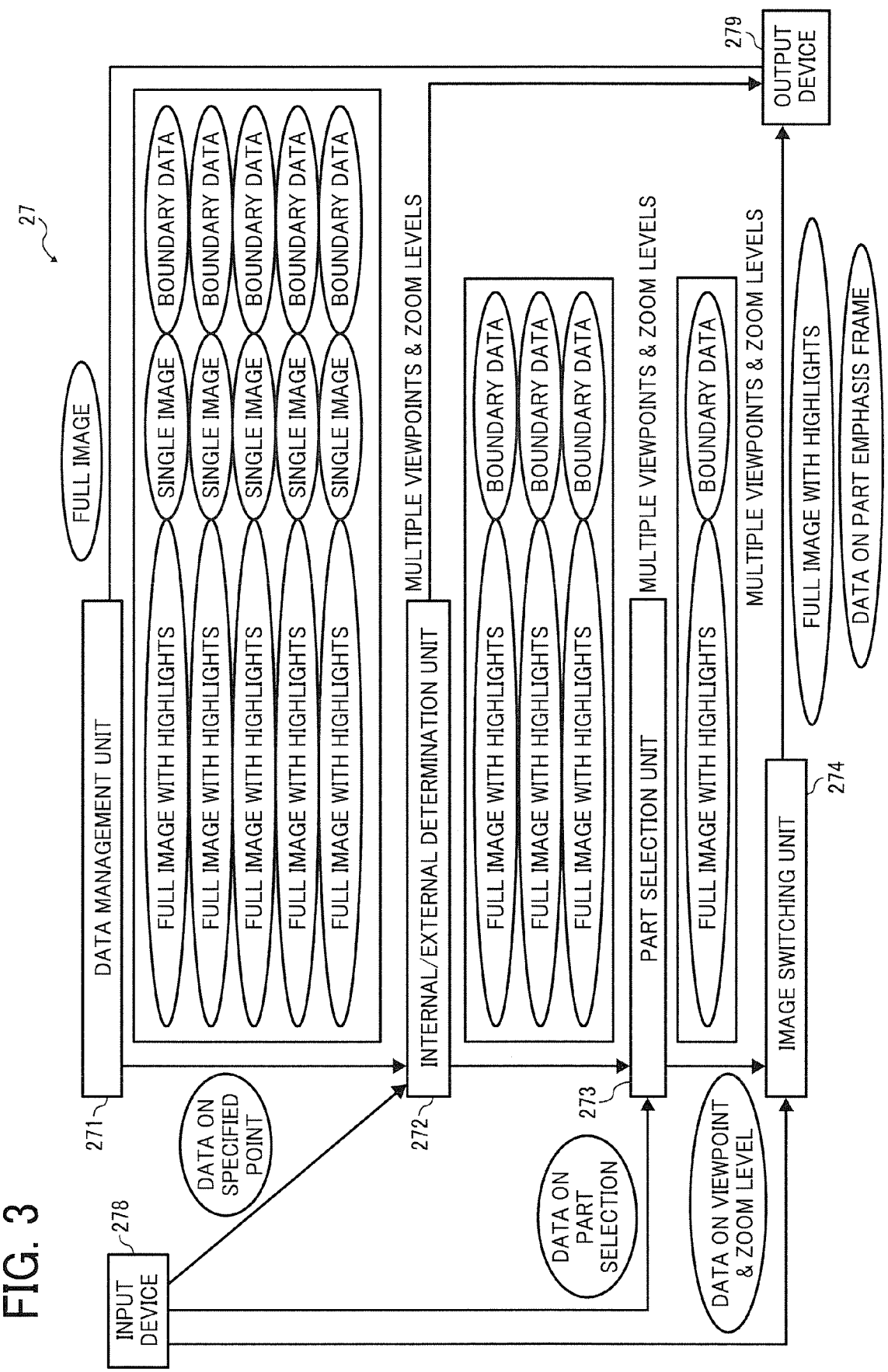
FIG. 3 is a block diagram illustrating a configuration of a catalog browser included in the parts catalog creation/browsing system.

FIG. 3 is a schematic view illustrating a configuration of the catalog browser 27 included in the parts catalog creation/browsing system. Arrows in FIG. 3 represent flows of data.

An input device 278 has a GUI function and corresponds to an input unit of the input/output device 3 illustrated in FIG. 1. The input device 278 includes a mouse and a keyboard, and instructions and data required for searching and browsing are input from the input device 278 by the user.

An output device 279 also has a GUI function, and corresponds to an output unit of the input/output device 3 illustrated in FIG. 1. The output device 279 includes a display, and data required when receiving instructions relating to search and browsing input by the user and results of search and browsing are displayed on the display.

A data management unit 271 manages a variety of data used for searching and browsing the parts catalog stored in a storage unit included therein.

When browsing is requested, the data management unit 271 references the catalog data stored in the catalog database 23 to acquire a full image of an entire model specified by the user and full images with highlights, single images, and boundary data for all parts included in the model viewed from multiple viewpoints at multiple zoom levels. Thereafter, the data management unit 271 writes the acquired images and data into the storage unit to respond to search and browsing requests. Therefore, in exemplary embodiments, the acquired images and data of all parts included in the specified model are sent to a downstream internal/external determination unit 272 to be described in detail later.

The full image with highlights described above is a full image of an entire model in which a target part temporarily selected by the user is highlighted. The target part is highlighted by displaying the target part differently from the other parts so that the target part is easily identifiable. Thus, for example, the target part may be displayed by a specific color such as red, or by flashing. Alternatively, the target part may be displayed in solid lines or as an actual image while the other parts are displayed in broken lines or as a wire frame image.

The single image described above is an image of a single part of the model, and includes attached data capable of specifying the part such as a name thereof.

The boundary data described above is data on a boundary between an area including the part and all other areas. For example, the boundary data includes geometric shape data such as a point, a curve, and a curved surface, and phase data indicating a correlation of the geometric shape data.

In exemplary embodiments, the full images with highlights and the boundary data for each part viewed from multiple viewpoints at multiple zoom levels are stored.

The internal/external determination unit 272 performs determination to reduce a number of parts to be searched from the full image of the entire three-dimensional model displayed on the display of the output device 279. To perform determination, the user is prompted to operate a pointer to specify a position of the target part in the full image of the entire three-dimensional model displayed on the screen. The internal/external determination unit 272 decides a closed region on the basis of the position specified by the user, and determines whether or not each of the parts belongs to the closed region. Thereafter, the internal/external determination unit 272 identifies the parts belonging to the closed region as the candidate parts which may be searched by the user.

More specifically, the user uses a pointer to specify a point around which the target part is included while the full image of the entire three-dimensional model viewed from a certain viewpoint is displayed on the display of the output device 279. As a result, a region including the point specified by the user, for example, a round region around the specified point, or a rectangular region in which the specified point is a point of intersection of two diagonal lines thereof, is determined as the closed region used for determination.

During the process of the second search, the internal/external determination unit 272 compares data on the closed region thus determined with boundary data for each part sent from the data management unit 271. Subsequently, the internal/external determination unit 272 extracts parts which have a boundary thereof in the closed region as the candidate parts, and sends full images with highlights and boundary data for the candidate parts to a part selection unit 273. The full images with highlights and the boundary data for the candidate parts are extracted from data sent from the data management unit 271 for each viewpoint and zoom level.

At the same time, the internal/external determination unit 272 displays the candidate parts thus extracted on the display of the output device 279 to prompt the user to select the target part. Therefore, the internal/external determination unit 272 sends single images or names of the candidate parts to the output device 279.

The part selection unit 273 receives the full images with highlights and the boundary data for the candidate parts viewed from multiple viewpoints at multiple zoom levels as the determination results from the internal/external determination unit 272, and manages the images and data thus received as data to be processed. In addition, when the user specifies the target part from the single images of the candidate parts displayed on the display of the output device 279 through the input device 278 in the preceding processing performed by the internal/external determination unit 272, the part selection unit 273 extracts full images with highlights and boundary data of the target part viewed from multiple viewpoints at multiple zoom levels to send the images and data thus extracted to an image switching unit 274 as data on the target part.

The image switching unit 274 receives the full image with highlights and the boundary data of the target part viewed from multiple viewpoints at multiple zoom levels, selected by the user in the preceding processing performed by the part selection unit 273.

Thereafter, the image switching unit 274 displays the full image in which the target part selected by the user is highlighted on the display of the output device 279 on the basis of the full images with highlights viewed from multiple viewpoints at multiple zoom levels received from the part selection unit 273.

When selecting the target part from the full image, the user specifies the viewpoint and the zoom level to be applied to the full image with highlights displayed on the display of the output device 279. The image switching unit 274 receives the instruction on the viewpoint and the zoom level from the input device 278 and switches the screen on the display from the full image from which the user selects the target part to a full image in which the target part selected by the user is highlighted in accordance with the instruction. When the user does not specify the viewpoint and the zoom level, a default setting is applied.

In addition, the image switching unit 274 has a function of displaying the target part by framing the target part with the part emphasis frame when the full image with highlights is displayed.

The part emphasis frame is displayed on the display of the output device 279 by creating an image having the part emphasis frame and superimposing the image thus created on the full image in which the target part is highlighted.

The image having the part emphasis frame is created as image data on which a frame image including the boundary of the target part is superimposed on the basis of the boundary data of the target part viewed from the viewpoint at the zoom value specified by the user. A predetermined shape of a frame which emphasizes the target part may be used. For example, the target part may be preferably emphasized by a frame having an elliptical shape calculated by a method to be described in detail later.

The image switching unit 274 switches the screen on the display of the output device 279 from the single images of the candidate parts to the full image in which the target part is highlighted with the part emphasis frame. Thereafter, the user confirms that the target part highlighted with the part emphasis frame is the part searched for by the user, and operates a confirmation key provided on the screen to complete the search.

Figure 6A:
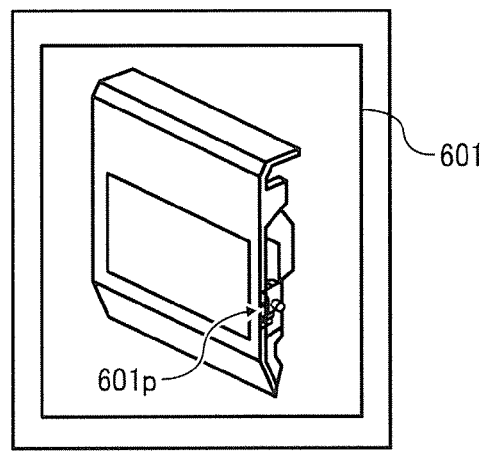
FIGS. 6A to 6C are views illustrating examples of screens displayed on a display of an input/output device having a GUI function during search.
Figure 6B:
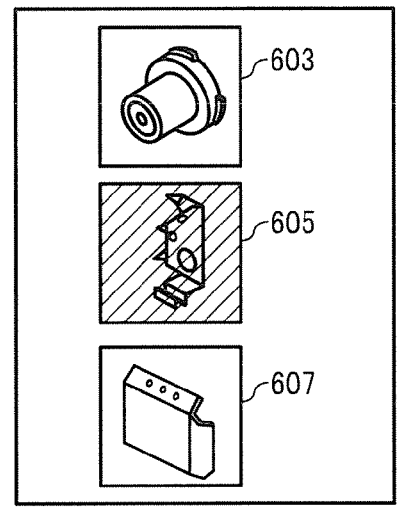
Figure 6C:
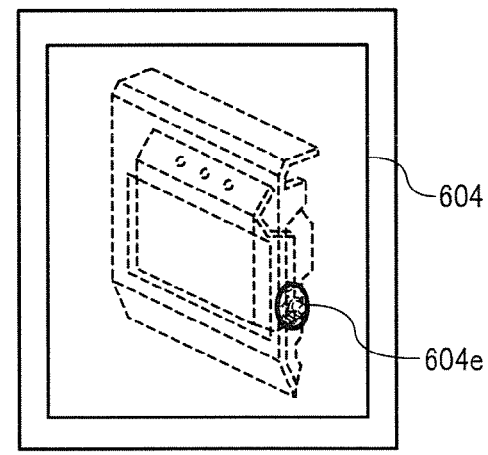
Figure 7:
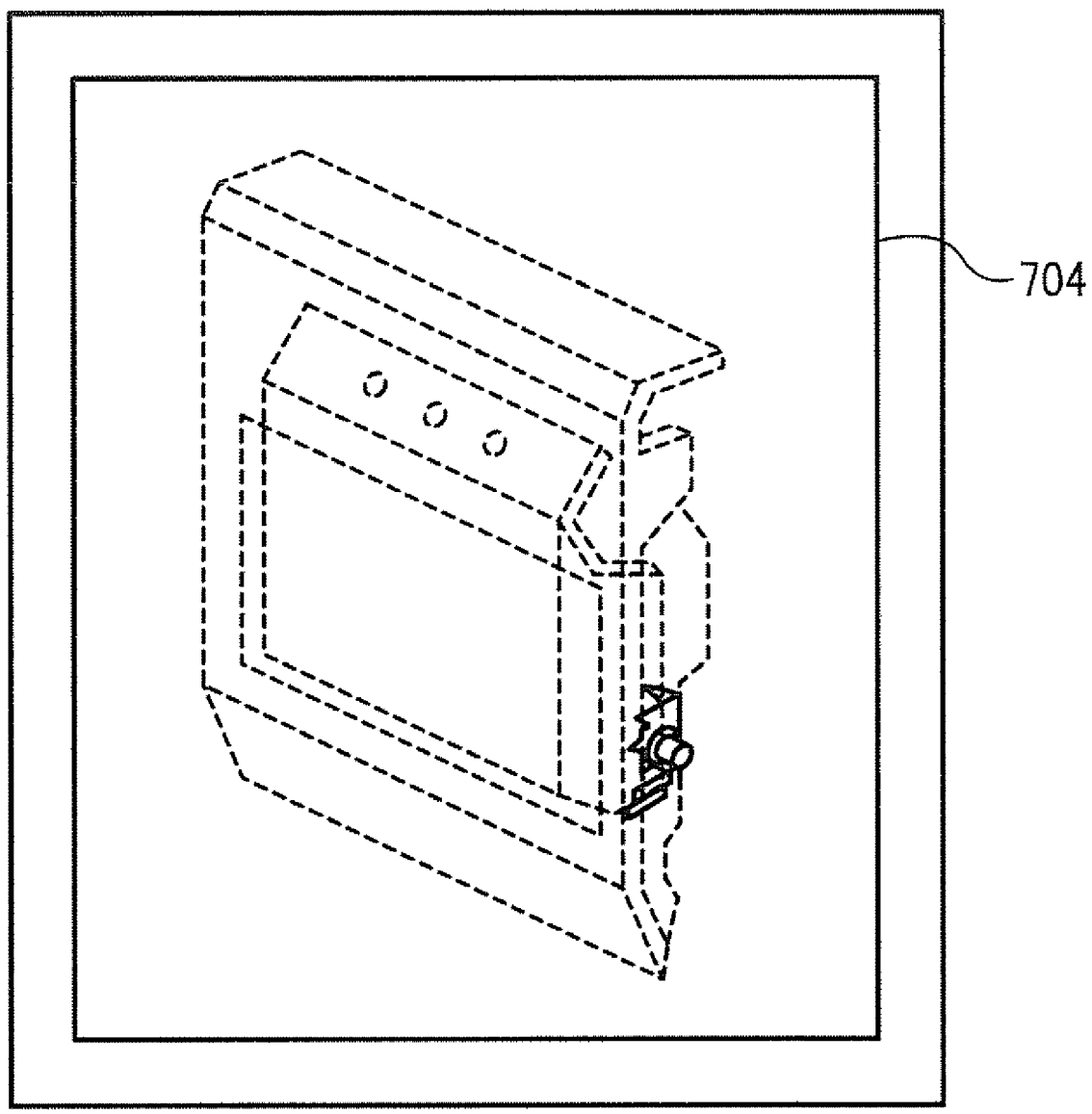
FIG. 7 is a view illustrating an example of a screen displaying a full image of an entire model in which a target part is highlighted without the part emphasis frame.

The processes of search and browsing performed by the catalog browser 27 are described in detail below, with reference to flow charts shown in FIGS. 4 and 5. FIGS. 6A to 6C are views illustrating examples of screens displayed on the display of the output device 279 during the search. FIG. 7 is a view illustrating an example of a screen displaying the full image in which the target part is highlighted without the part emphasis frame. FIGS. 6A to 6C and 7 are also referred in the following description of the processes of search and browsing performed by the catalog browser 27.

In the first search, at S101, a selection screen including a list of three-dimensional models stored in the catalog database 23 is displayed on the display of the output device 279. A three-dimensional model to be browsed is specified by the user on the screen through the input device 278.

At S102, the data management unit 271 acquires the full image of the entire three-dimensional model thus specified and the full image with highlights, the single image, and the boundary data for each part included in the three-dimensional model viewed from multiple viewpoints at multiple zoom levels from the catalog database 23 based on the instruction from the input device 278 to write those images and data into the storage unit thereof. In addition, the data management unit 271 displays the full image of the entire three-dimensional model thus specified on the display of the output device 279, and sends the full images with highlights, the single images, and boundary data for each part of the three-dimensional model viewed from multiple viewpoints at multiple zoom levels to the internal/external determination unit 272.

The screen 601 illustrated in FIG. 6A is an example of the full image of the entire three-dimensional model displayed on the display of the output device 279 at this time.

Next, in the second search, the user is prompted to specify a point around which a part to be browsed is to be included in the full image of the entire three-dimensional model displayed on the display of the output device 279 using the pointer of the input device 278, such that the number of parts subjected to search is limited. The point specified by the user using the pointer is indicated by an arrow 601p in the screen 601 illustrated in FIG. 6A.

Upon receiving instruction on the point specified by the user using the pointer, at S103, the internal/external determination unit 272 extracts candidate parts subjected to the third search from the full images with highlights, the single images, and the boundary data for each part sent from the data management unit 271. Thereafter, the internal/external determination unit 272 displays the results on the display of the output device 279. A series of processes performed by the internal/external determination unit 272 is described in detail below with reference to FIG. 5. FIG. 5 is a flow chart illustrating a process of displaying the candidate parts performed as a sub-sequence of S103 in the process illustrated in FIG. 4.

First, at S201, the internal/external determination unit 272 acquires a combination of the full image with highlights, the single image, and the boundary data of a part from data on the three-dimensional model sent from the data management unit 271.

Next, at S202, the internal/external determination unit 272 compares data on the closed region determined on the basis of the point specified by the user with the boundary data on the part acquired at S201 to confirm whether or not the boundary of the part is included in the closed region.

When the boundary of the part is not included in the closed region (NO at S202), the part is excluded from the candidate part because the part is not the target part searched for by the user. Thereafter, at S204, the internal/external determination unit 272 checks whether or not parts on which internal/external determination is not yet performed exist in order to acquire such parts subjected to a next internal/external determination from a group of parts included in the three-dimensional model to be searched.

By contrast, when the boundary of the part is included in the closed region (YES at S202), the internal/external determination unit 272 identifies the part as the candidate part to be searched, and extracts the combination of data described above relating to the part.

Next, at S203, the internal/external determination unit 272 displays the candidate part thus extracted on the display of the output device 279. At this time, a list of single images or names of the candidate parts is displayed on the display of the output device 279. FIG. 6B illustrates an example of a display in which screens 603, 605, and 607 are displayed as the candidate parts thus extracted. When a larger number of parts is extracted as the candidate part, and therefore single images of all the candidate parts are not displayed on one screen, the single images can be viewed by scrolling down the screen.

At S203, the internal/external determination unit 272 extracts the full images with highlights and the boundary data for the candidate parts viewed from multiple viewpoints at multiple zoom levels to send such images and data to the part selection unit 273 while displaying the list of the candidate parts. The images and data described above are sent to the part selection unit 273 in advance because the full image with the highlights is to be displayed when the user selects the target part in the subsequent step, and the boundary data is used to create the part emphasis frame to be displayed by superimposition onto the full image with highlights.

Next, at S204, the internal/external determination unit 272 checks whether or not there are parts on which internal/external determination performed in S201 to S203 is not yet performed. When such parts exist (YES at S204), the process returns to S201.

Figure 5:
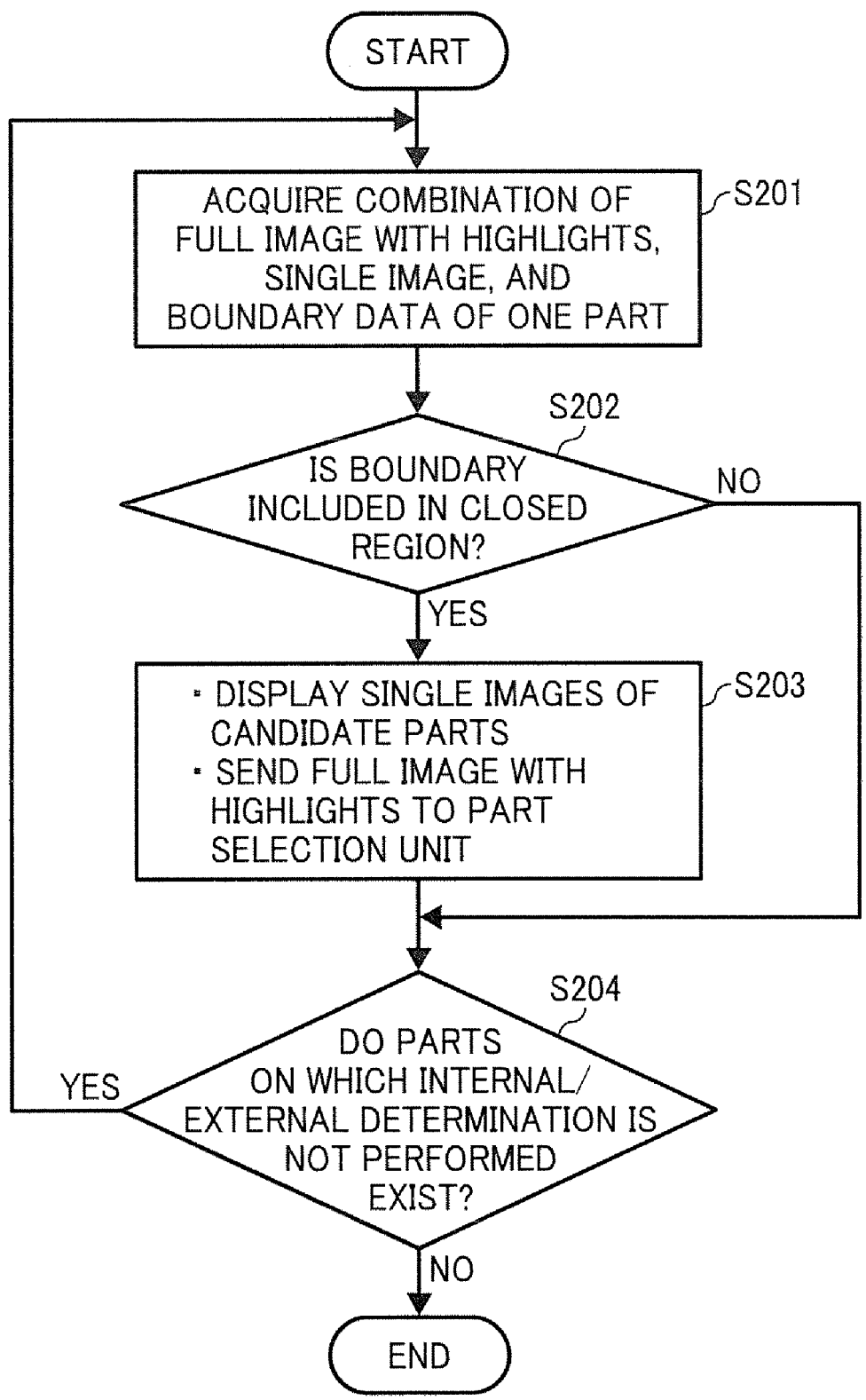
FIG. 5 is a flow chart illustrating a process of displaying candidate parts performed as a sub-sequence of S103 in the process illustrated in FIG. 4.

When such parts do not exist (NO at S204), the series of processes performed by the internal/external determination unit 272 illustrated in FIG. 5 is completed.

Figure 4:
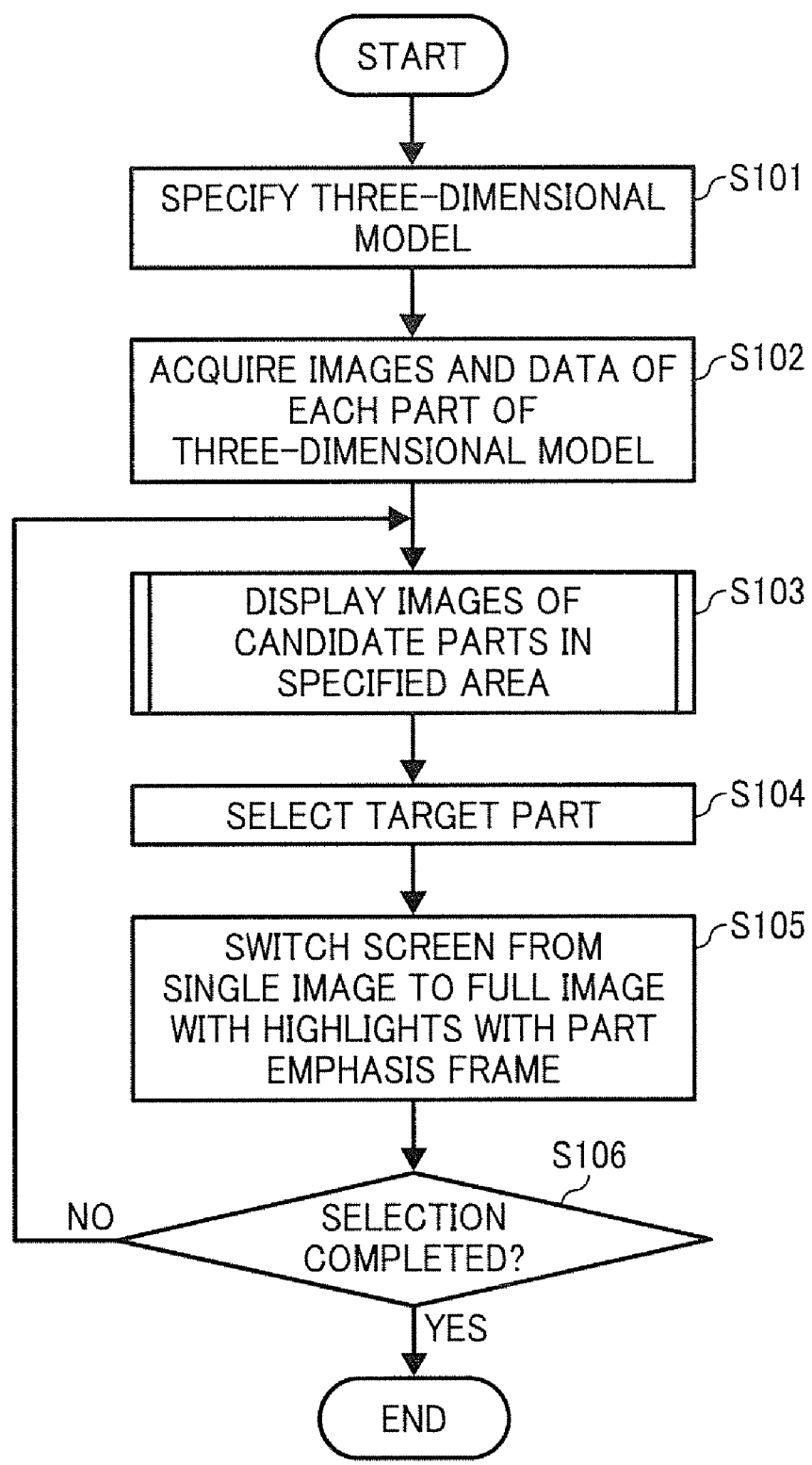
FIG. 4 is a flow chart illustrating a process of searching and browsing performed by the catalog browser.

Thereafter, the process proceeds to S104 in the flow chart illustrated in FIG. 4. At S104, the user selects the target part from the candidate parts selected in the preceding processes. Specifically, the user specifies the target part from the single images or the names of the candidate parts displayed on the display of the output device 279 and inputs the instruction for the third search through the input device 278. The part selection unit 273 receives the instruction from the input device 278, and extracts the full image with highlights and boundary data of the target part viewed from multiple viewpoints at multiple zoom levels from the images and data received from the internal/external determination unit 272. The full image with highlights and boundary data of the target part thus extracted are sent to the image switching unit 274.

Next, at S105, the image switching unit 274 manages the full image with highlights and the boundary data of the target part sent from the part selection unit 273, and switches the screen displayed on the display of the output device 279 from the candidate parts to the full image in which the target part is highlighted in accordance with the default display setting or the viewpoint and the zoom level requested by the user.

At this time, as indicated by the screen 604 in FIG. 6C, the full image is displayed by a broken line or a wire frame image while the target part is displayed by a solid line. FIG. 6C illustrates an example of the full image with highlights when the part displayed in the screen 605 in FIG. 6B is selected by the user as the target part from the single images of the candidate parts displayed on the display of the output device 279 as illustrated in FIG. 6B.

The full image with highlights in which the target part is highlighted is displayed on the display of the output device 279 using the full image with highlights sent from the part selection unit 273 in accordance with the viewpoint and the zoom level specified by the user through the input device 278.

Simultaneously, the part emphasis frame is superimposed on the full image in which the target part is highlighted.

As described above, the part emphasis frame is created as image data onto which an image of a frame including the boundary of the target part is superimposed in accordance with the boundary data of the target part viewed from the viewpoint and the zoom level specified by the user. When the viewpoint and the zoom level are not specified by the user, the full image with highlights is displayed using a default viewpoint and zoom level.

Although a predetermined shape of the frame capable of emphasizing the target part may be used, FIG. 6C illustrates an example in which the target part is emphasized by a frame having an elliptical shape.

Steps for calculating the ellipse necessary for creating image data of the ellipse used as the part emphasis frame on the basis of boundary data of the target part are described in detail below.

In Step 1, the boundary data is considered as data on a line in X-Y coordinate system, and maximum and minimum values for X and Y components (X_min, Y_min, X_max, and Y_max) of points on the line are obtained.

Figure 8:
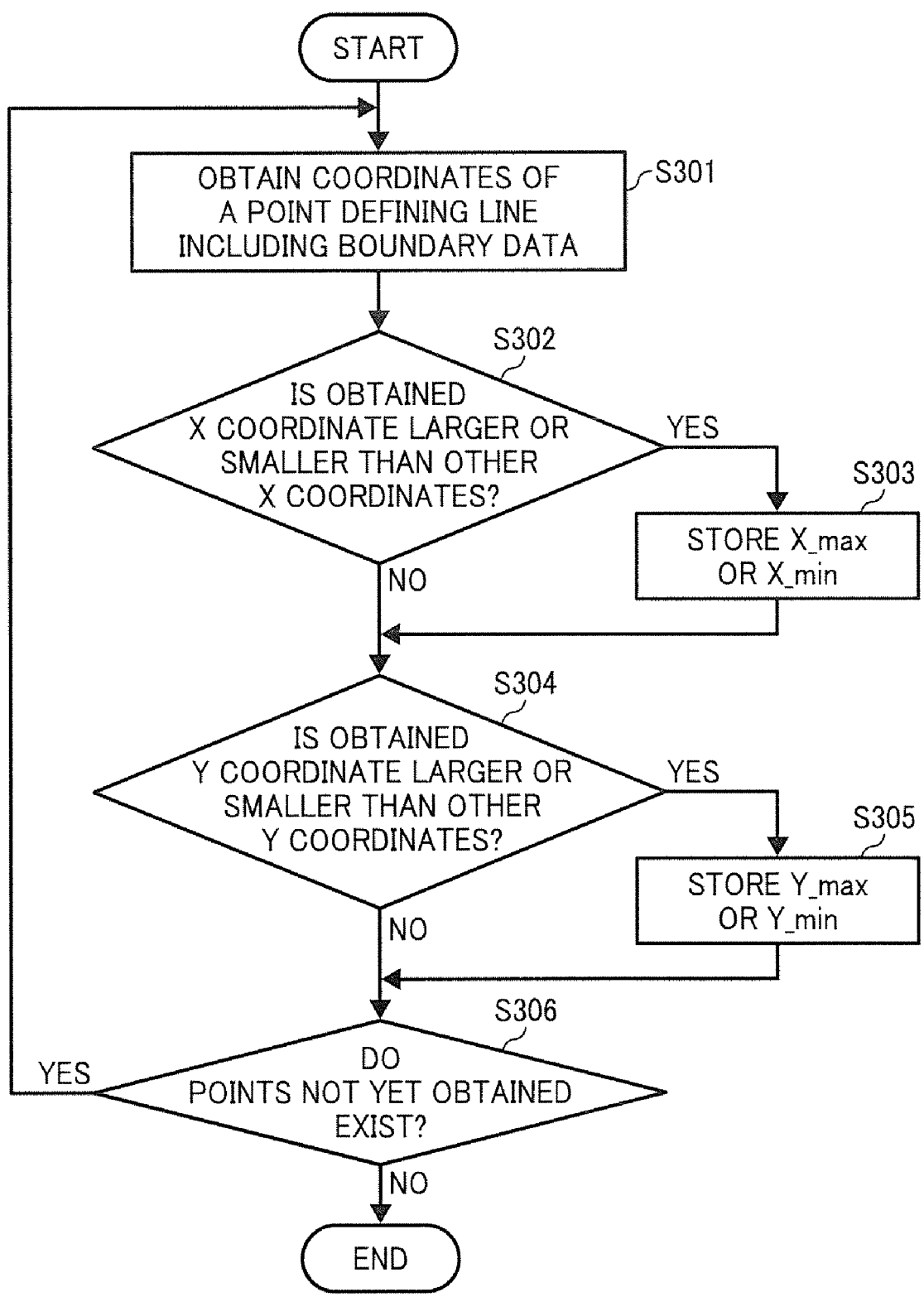
FIG. 8 is a flow chart illustrating a process of calculating an ellipse used as a part emphasis frame.

Processes to obtain the maximum and minimum values of X and Y components on the boundary are described in detail below with reference to FIG. 8.

At S301, one of points defining the line including the boundary data is specified to obtain X and Y coordinates of the point. Next, at S302, a process for checking whether or not the X coordinate thus obtained is larger or smaller than X coordinates of the other points is performed. At S303, when the X coordinate thus obtained is larger or smaller than the X coordinates of the other points, the X coordinate is stored as X_max or X_min. Thereafter, the process proceeds to check the Y coordinate.

By contrast, when the X coordinate thus obtained is not larger or smaller than the X coordinates of the other points, the process immediately proceeds to check the Y coordinate.

At S304, a process for checking whether or not the Y coordinate thus obtained is larger or smaller than Y coordinates of the other points is performed. At S305, when the Y coordinate thus obtained is larger or smaller than the Y coordinates of the other points, the Y coordinate is stored as Y_max or Y_min. By contrast, when the Y coordinate thus obtained is not larger or smaller than the Y coordinates of the other points, the process immediately proceeds to S306.

At S306, a process to check whether or not there are any points defining the boundary on which the above-described processes are not yet performed is performed. When there are such points (YES at S306), the process returns to S301 to perform the steps up to S306 again. When there are no such points (NO at S306), the series of processes is finished.

In Step 2, center coordinates of the ellipse (X_cen and Y_cen) are calculated using the following formulae on the basis of X_min, Y_min, X_max, and Y_max obtained as described above, and the results are stored in the storage unit:

$$X\_cen = (X\_max + X\_min)/2$$

$$Y\_cen = (Y\_max + Y\_min)/2$$

In Step 3, lengths (X_len and Y_len) of X and Y axes (major and minor axes) of the ellipse are calculated using the following formulae on the basis of X_min, Y_min, X_max, and Y_max obtained as described above, and the results are stored in the storage unit:

$$X\_len = (X\_max - X\_min)/2$$

$$Y\_len = (Y\_max - Y\_min)/2$$

The center coordinates of the ellipse (X_cen and Y_cen) and the lengths (X_len and Y_len) of the X and Y axes (major and minor axes) of the ellipse are used as control parameters necessary for creating the image data of the ellipse used as the part emphasis frame.

Specifically, the center coordinates of the ellipse (X_cen and Y_cen) and the lengths (X_len and Y_len) of the X and Y axes (major and minor axes) of the ellipse are set as the control parameters for a unit for creating the image of the ellipse included in the image switching unit 274 to create an image of the frame including the boundary of the target part.

The image switching unit 274 creates the image of the part emphasis frame as described above, and displays the part emphasis frame by superimposing the part emphasis frame on the full image in which the target part is highlighted.

As illustrated in the screen 604 in FIG. 6C, the full image in which the target part is highlighted is displayed by highlighting the target part displayed in the screen 605 in FIG. 6B and superimposing the part emphasis frame 604e on the target part. In the screen 604 in FIG. 6C, the target part is more easily recognized by framing the target part with the part emphasis frame, compared to the screen 704 illustrated in FIG. 7 in which the target part is highlighted without the part emphasis frame.

After the image switching unit 274 switches the display from the screen displaying the single images of the candidate parts to the screen displaying the full image in which the target part temporarily selected by the user is highlighted with the part emphasis frame, the user ultimately confirms whether or not the target part displayed on the screen is the part searched for by the user. When the user confirms that the target part displayed on the screen is the part searched for by the user by operating the confirmation key, the catalog data of the target part can be browsed. Thereafter, when the user does not start a new search for another part included in the model, at S106, the user operates an end key to finish the process. The image switching unit 274 confirms the instruction input by the user (YES at S106) and finishes the series of processes.

By contrast, when continuing to browse another part, the user operates a continue key, and the image switching unit 274 confirms the operation input by the user (NO at S106). Thereafter, the process returns to S103, and the steps up to S106 are repeated.

The foregoing exemplary embodiments enable the number of the candidate parts to be searched to be limited by specifying the point around which the target part is included in the full image of the entire three-dimensional model displayed on the screen. In addition, in the full image in which the target part temporarily selected by the user is highlighted in order to confirm whether or not the target part is the part searched for by the user, the target part is highlighted with the part emphasis frame, so that visibility of the target part is enhanced even when it is difficult to find the target part because the target part is too small relative to the full image. As a result, work efficiency of the user is also improved.

Further, according to the foregoing exemplary embodiments, the search for and browsing of the target part is performed by using two-dimensional image data. Accordingly, the target part can be searched and browsed by a simple operation compared to the conventional method using three-dimensional image data. As a result, the foregoing exemplary embodiments are also applicable to a computer with lower performance.

Numerous additional modifications and variations are possible in light of the above teachings. It is therefore to be understood, that within the scope of the appended claims, the disclosure of this patent specification may be practiced otherwise than as specifically described herein.

What is claimed is:

1. An image searching device, comprising:
   a database configured to store two-dimensional full images of models, each model including multiple parts, highlighted full images in which a part is highlighted, single images of each part, each part being created based on a three-dimensional image of the model, and boundary data for each part;
   a user interface having a graphical user interface function;
   a search unit configured to search for a single image of a part and a highlighted full image through the database in accordance with search criteria specified through the user interface; and
   an output unit configured to output search results from the search unit, wherein the search unit comprises:
   a data management unit configured to manage data on a model to be searched and acquired from the database and create an image to be displayed on a screen of the user interface in accordance with first search criteria input through the user interface;
   a determination unit configured to determine and extract parts each having a boundary included in a closed region as candidate parts by comparing the closed region specified using a pointer in a full image of the entire model to be searched and displayed on the screen of the user interface with boundary data for each part of the model to be searched in accordance with second search criteria;
   a part selection unit configured to display single images of the candidate parts extracted by the determination unit on the screen of the user interface to receive third search criteria for selecting a target part from the candidate parts displayed on the screen; and
   an image switching unit configured to create data on a part emphasis frame to be added to the target part in the full image with highlights displayed on the screen based on the boundary data of the target part, and switch the screen displayed on the user interface from the single images of the candidate parts to a full image in which the target part is highlighted with the part emphasis frame.

2. The image searching device according to claim 1, wherein the image switching unit comprises a calculation unit configured to calculate a shape of a frame including the boundary data of the target part to create data on the part emphasis frame.

3. The image searching device according to claim 1, wherein the two-dimensional full images of models, single images of each part, and highlighted full images stored in the database are displayed from multiple viewpoints at multiple zoom levels, and the data management unit creates a single image and a full image with highlights displayed on the screen of the user interface in accordance with a viewpoint and a zoom level specified through the user interface.

4. An image searching method, comprising:
   storing two-dimensional full images of models, each model including multiple parts, highlighted full images in which a part is highlighted, single images of each part, each part is created based on a three-dimensional image of the model, and boundary data for each part in a database; and searching for a single image of a part and a highlighted full image stored in the database in accordance with search criteria specified by the database through a user interface having a graphical user interface function, wherein the searching comprises:

managing data on a model to be searched and acquired from the database to create an image to be displayed on a screen of the user interface in accordance with first search criteria input through the user interface;

determining and extracting parts each having a boundary included in a closed region as candidate parts by comparing the closed region specified using a pointer in a full image of the entire model to be searched and displayed on the screen of the user interface with boundary data for each part of the model to be searched in accordance with second search criteria;

selecting a target part from the candidate parts by displaying single images of the candidate parts extracted by the determining on the screen of the user interface to receive third search criteria; and switching the screen displayed on the user interface from the single images of the candidate parts to a full image in which the target part is highlighted with a part emphasis frame created based on the boundary data of the target part.

5. The image searching method according to claim 4, wherein the switching comprises calculating a shape of a frame including the boundary data of the target part to create data on the part emphasis frame.

6. The image searching method according to claim 4, wherein the two-dimensional full images of models, single images of each part, and highlighted full images stored in the database are displayed from multiple viewpoints at multiple zoom levels, and the managing comprises creating a single image and a full image with highlights displayed on the screen of the user interface in accordance with a viewpoint and a zoom level specified through the user interface.

7. A non-transitory computer-readable recording medium recording a program for causing a computer to function as the search unit of the image searching device according to claim 1.

* * * * *